United States Patent [19]

Dahle et al.

[11] 4,231,145
[45] Nov. 4, 1980

[54] METHOD AND APPARATUS FOR ATTACHING TWO OBJECTS

[75] Inventors: Orvar Dahle; Olov Einarsson; Folke Lindkvist; Stefan Valdemarsson, all of Vesteras, Sweden

[73] Assignee: ASEA Aktiebolag, Vesteras, Sweden

[21] Appl. No.: 967,509

[22] Filed: Dec. 7, 1978

[30] Foreign Application Priority Data

Dec. 13, 1977 [SE] Sweden .................................. 7714103

[51] Int. Cl.³ ...................... B23P 11/00; B23P 19/00; B21D 39/00
[52] U.S. Cl. ........................................ 29/432; 29/521; 29/739; 29/798
[58] Field of Search ................. 29/238, 407, 432, 505, 29/521, 739, 751, 758, 760, 761, 798

[56] References Cited

U.S. PATENT DOCUMENTS

| 220,996 | 10/1879 | Singer | 29/432 |
|---|---|---|---|
| 1,446,973 | 2/1923 | Junkers | 29/505 |
| 2,120,711 | 6/1938 | Phillips | 29/432 |
| 2,542,376 | 2/1951 | Torresen | 29/505 |
| 3,851,373 | 12/1974 | Shinjo | 29/798 X |

*Primary Examiner*—Ervin M. Combs
*Attorney, Agent, or Firm*—Watson, Cole, Grindle & Watson

[57] ABSTRACT

Method and apparatus for attaching a transducer to an object having characteristics to be measured. At least two attachment elements each including a number of pointed members are interconnected by a sensing element. Each attachment element includes a movable wedge member and at least one fixed wedge member whereby initial movement of the movable wedge member with respect to the fixed wedge member subjects said pointed members to a pressure force of a specified magnitude to press the pointed members into the surface of the object. Further movement of the movable wedge member with respect to the fixed wedge member generates a holding force on the pointed members less than the initial pressure force to hold each attachment element in engagement with the object regardless of transverse forces acting on the attachment elements.

7 Claims, 7 Drawing Figures

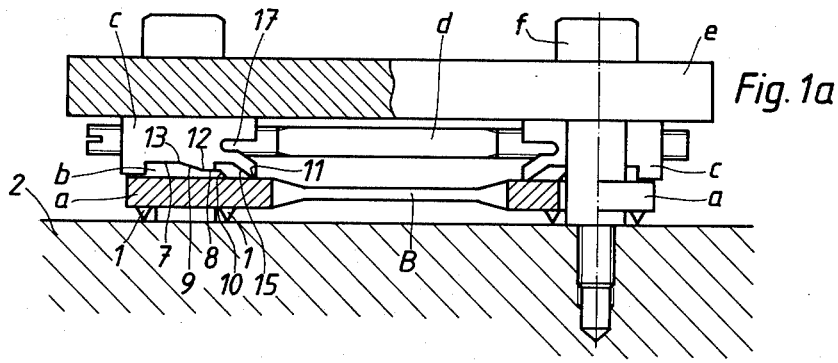
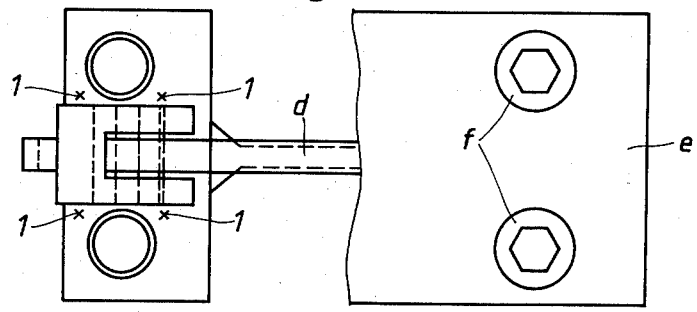
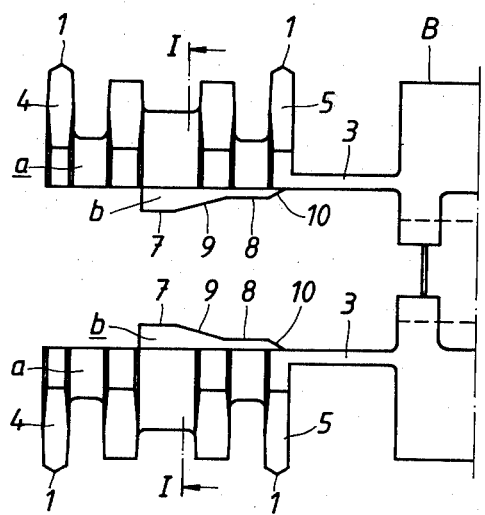
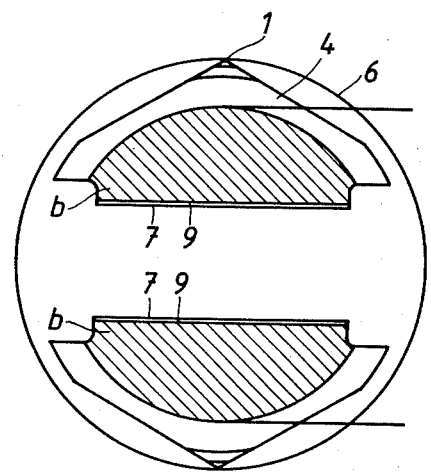
Fig. 1a
Fig. 1b
Fig. 2a
Fig. 2b

METHOD AND APPARATUS FOR ATTACHING TWO OBJECTS

BACKGROUND OF THE INVENTION

1. Field of the Invention

The present invention relates to a method and a device for attaching one object to another object, and more particularly to such a device for attaching a transducer to an object having a characteristic to be measured and avoiding creep.

2. Prior Art

If a device of the above-mentioned kind is used to clamp an object with a force of normal magnitude and is then loaded with a transverse force which is small in relation to the clamping force, for example only one or a few percent thereof, the contact points will creep in the direction of the transverse force. This phenomenon is explained by the fact that the material around the contact points is prestressed to the yield point of the clamping force, so that even a very small additional force in the transverse direction results in further yielding in that direction. If two spaced contact points of such a kind are clamped in the aforesaid manner, and are used to attach a deformation transducer to a measured object, the resultant yielding or creep results in a displacement of the zero point of the transducer upon deformation of the measured object.

SUMMARY OF THE INVENTION

According to the invention, said disadvantage of attaching by indented points is avoided because the clamping force required for pressing the points of the attaching device into the object after the initial pressing force is reduced to a lower value, namely, the holding force. This eliminates the risk of yielding at the contact surfaces between the points and the measured object upon additional loading by a transverse force.

The principle of the attaching device can be carried out in many different ways with more or less high demands on accuracy and care in the application of the deformation transducer. The application which is most simple in principle is to press in the points to the necessary depth by using a screw with a long weak neck for obtaining a certain resilience, and thereafter easing off the screws somewhat. However, this method does not result in a well-defined holding force. However, by using a spring element, suitably in the form of two cup springs facing each other, or facing away from each other, it is possible to obtain relatively well-defined values of the pressing force as well as the holding force with a certain amount of care and with the help of a feeler gauge. In the two methods now mentioned, the screws must, of course, be self-locking, for example by a nylon plug.

The invention will be shown and described partly by a more general embodiment, and partly by a special embodiment adapted to the transducer according to U.S. patent application Ser. No. 936,769.

BRIEF DESCRIPTION OF THE FIGURES

In the accompanying drawings:

FIG. 1a shows a side view of an elongated transducer with the attachment formed by indented points;

FIG. 1b shows a side view of the transducer;

FIG. 2a shows a side view of a transducer for attachment to a circular hole;

FIG. 2b shows a section along the line I—I of FIG. 2a;

FIG. 3b shows a top view of the wedge member according to FIG. 3a; and

DETAILED DESCRIPTION

Figure 3A:
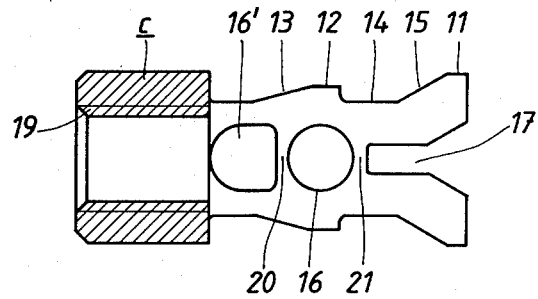
FIG. 3a shows a side view of a wedge member.

FIG. 1a shows an elongated transducer having measuring part B and attachment parts a at each end. Each attachment part a is provided with points 1 intended to be pressed into object 2, the elongation of which is to be measured. On the side of each attachment part a located opposite to points 1 there is fixed wedge member b having two plane pressure surfaces 7 and 8 and two inclined surfaces 9 and 10. Movable wedge member c is arranged to cooperate with fixed wedge member b and is provided for this purpose with two plane pressure surfaces 11 and 12 and two inclined surfaces 13 and 15. The two movable wedge members c are adapted to be displaced towards or away from each other by screw d having a threaded part at each end, and which has each of its threaded ends in engagement with a movable wedge member b. The screw ends are threaded in the opposite directions so that when screw d is turned, the movable wedge members c move either towards or away from each other. Movable wedge members c are held pressed against attachment parts a by plate e and screws f which are screwed into object 2.

FIG. 1a shows the elongated transducer before being attached to the measured object. When being attached thereto, screw d is turned so that left-hand wedge member c moves to the left and right-hand wedge member c moves to the right. The two sloping surfaces 9 and 13 cause points 1 to be pressed into the measured object. When plane pressure surface 12 is positioned over pressure surface 7, a maximum pressing force is achieved. During the continued movement of movable wedge members c to the left or right, pressure surfaces 7 and 12 are dis-engaged from one another, but before that occurs pressure surface 11 arrives at pressure surface 8. The part of the wedge member c that supports pressure surface 11 is, however, resilient because of slot 17, so that the force now operating on points 1 is smaller than the maximum pressing force and constitutes the holding force which retains the transducer, even if the object 2 is subjected to elongation. The heights of pressure surfaces 7 and 12 are chosen so that a sufficient clamping force is obtained, and the heights of pressure surfaces 8 and 11 and the dimensions of slot 17 are chosen so that a sufficient holding force is applied to attachment parts a also when the transducer is subjected to a transverse force because of the elongation of the measured object. Because the pressure surfaces and the slot are fixed in their dimensions, a correct clamping force and holding force are always achieved.

In FIG. 2a, the measuring part of the transducer is designated by B, which is not shown in detail in this Figure since it is not part of the invention. At each end the measuring part supports two attachment parts a, which are each attached to the measuring part by means of thin resilient beams 3. At their ends each attachment part a is provided with attachment element 4, 5, each consisting of a symmetrical, substantially triangular disc, the tip of which is formed as a hardened point 1, which is illustrated more clearly in FIG. 2b showing a section along the line I—I in FIG. 2a. The circular hole, in which the transducer is intended to be attached, is shown by circle 6 in FIG. 2b. On their sides facing each other, the attachment parts a support two fixed wedge members b having upper pressure surface 7 and lower pressure surface 8. Between the two pressure surfaces 7, 8 there extends sloping surface 9, and between lower pressure surface 8 and attachment part a there extends another sloping surface 10. Fixed wedge members b are constructed for cooperation with movable wedge member c, which is shown in FIGS. 3a, 3b and 3c.

Figure 3B:
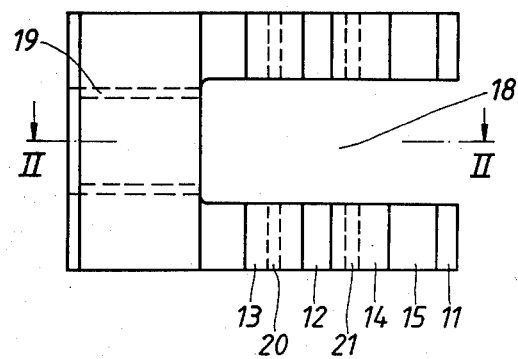
Figure 3C:
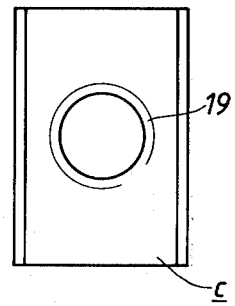
FIG. 3c shows an end view of the wedge member according to FIG. 3b.

As shown in FIG. 3a, wedge member c is intended to be located between the two attachment parts a in FIG. 2a. On either side, wedge member c has upper pressure surface 11 and lower pressure surface 12. To the left of lower pressure surface 12 there is sloping surface 13, and between two pressure surfaces 11, 12, wedge member c is formed with plane surface 14 and sloping surface 15. Right between the two pressure surfaces 12 there are through holes 16 and 16′, and at the right-hand end of wedge member c there is provided through-going slot 17. Wedge member c is provided with through hole 18 which, at the left-hand end of the member, is provided with threads 19 which are in engagement with a screw (not shown) passing through hole 18, for moving wedge member c. FIG. 3b shows a top view of the wedge member and FIG. 3c is a view of FIG. 3b seen from the left-hand side.

When movable wedge member c is located in the slot between the two attachment parts a and is in its initial position, sloping surface 9 on fixed wedge member b is located right in front of sloping surfaces 13 on movable wedge member c. The wedge members do not affect each other, and points 1 have such a position in relation to hole 6 in supporting body 2 to permit the transducer to be moved into the hole. When the transducer is to be clamped into the hole, the screw in hole 18 is turned so that movable wedge member c is moved to the left with the help of threads 19. Surfaces 9 and 13 make contact with each other and press apart attachment parts a, so that points 1 are pressed into the hole wall. The pressure on movable wedge member c, which successively increases during this movement, effects an upsetting of thin walls 20 and 21, respectively, between holes 16, 16′ and between hole 16 and slot 17, respectively, thus making hole 16 more or less oval. Because of this upsetment, the diameter of the hole, into which the transducer is to be attached, can be allowed to vary by 0.4 mm. When sloping surfaces 9 and 13 have passed each other, plane pressure surfaces 7 and 12 are brought into contact with each other. In this way, a maximum clamping force is attained and this state remains until surfaces 7 and 12 are separated from each other during the continued movement to the left of wedge member c. Before this occurs, however, pressure surfaces 8 and 11 are brought into contact with each other. When surfaces 7 and 12 disengage, surfaces 8 and 11 maintain points 1 in the indentations in the hole wall. However, the slot 17 between surfaces 15 and 11 causes the spring constant between surfaces 11 to become considerably smaller than between surfaces 12, so that the pressure acting on points 1 is reduced. The points maintain their position in the indentations, but the pressure with which the points bear against the walls in the indentations is reduced to such an extent that the material at the indentations does not reach the yield point, even if the points are loaded with a certain transverse force from the deformation measuring element. Thus, the clamping force can be determined by dimensioning upsetting elements 20, 21, and the holding force is determined by dimensioning slot 17 so that the desired values are obtained.

What is claimed is:

1. Method for attaching a deformation transducer to a measured object without creep, the transducer being arranged in a space between a plate clamped relative to the measured object, the deformation transducer having at least two attachments formed by a number of points or the like at each attachment and with a deformation-sensing element between the said attachments, comprising the steps of:
   providing a normal force securing the transducer by a clamping force determined by mutually movable pressure surfaces included in each attachment, the points being pressed into the measured object to a depth determined by the pressure surfaces; and
   at least partially disengaging the pressure surfaces to reduce the clamping force to such a value that the stresses in the material in the measured object making contact with the surfaces of the points are reduced to such an extent below the yield point that an additional force from the deformation-sensing element perpendicular to the normal force cannot again increase the stress in the material of the measured object at the surfaces of the points to above the yield point.

2. Apparatus for attaching a transducer to an object having a characteristic to be measured, comprising:
   at least two attachment elements each including a number of pointed members and interconnected by a sensing element of the transducer, each attachment element including a movable wedge member and at least one fixed wedge member; and
   means for manually moving said movable wedge member with respect to said fixed wedge member in at least two successive stages, the movement of said movable wedge member and said at least one fixed member during the first stage subjecting said pointed members to a pressure force of a specified magnitude causing said pointed members to be pressed into the surface of said object, movement of said movable wedge member with respect to said fixed wedge member during a successive stage of movement providing a holding force on said pointed members that is less than said initial pressure force to hold each attachment element in engagement with said object when said attachment elements are subjected to a force transverse to said holding force.

3. Apparatus according to claim 2, wherein each of said attachment elements are resilient relative to each other and to said sensing means.

4. Apparatus according to claim 3, wherein each of said fixed wedge members include first pressure surfaces, and each of said at least one movable wedge member includes second pressure surfaces, and with manual operation of said means for moving during the first stage of movement of said movable wedge member at least one of said first pressure surfaces is first brought into engagement with at least one of said second pressure surfaces and with continued manual operation of said means for moving during said successive stage of movement the remaining of said first pressure surfaces contact the remaining of said second pressure surfaces.

5. Apparatus according to claim 4, wherein the engagement of the remaining of said first and second pressure surfaces releases the initial engagement between said first and second pressure surfaces.

6. Apparatus according to any of claims 3-5, wherein the respective heights of said first and second pressure surfaces is such that said pointed elements are subjected to a clamping force with the initial engagement of said first and second pressure surfaces, and said pointed elements are subjected to a holding force with the remaining of said first and second pressure surfaces in engagement with each other.

7. Means according to claim 3 or 4, wherein each of said at least one movable wedge member further includes through holes and a slot between which the remaining material forms upsetting elements which are upset when said first and second pressure surfaces are in engagement with each other, said upsetting elements being dimensioned so that the desired penetrating force is obtained.

* * * * *